United States Patent [19]

Gadkaree

[11] Patent Number: 4,992,318

[45] Date of Patent: Feb. 12, 1991

[54] LAMINATED HYBRID CERAMIC MATRIX COMPOSITES

[75] Inventor: Kishor P. Gadkaree, Big Flats, N.Y.

[73] Assignee: Corning Incorporated, Corning, N.Y.

[21] Appl. No.: 426,991

[22] Filed: Oct. 26, 1989

[51] Int. Cl.$^5$ .................... B32B 5/12; C04B 35/56
[52] U.S. Cl. ........................... 428/114; 501/88;
501/95; 428/113; 428/294; 428/293; 428/292;
428/297; 428/298; 428/323; 428/325; 428/426;
428/428; 428/697; 428/701; 428/702; 428/368;
428/698; 428/448; 428/212; 428/902
[58] Field of Search ............ 501/88, 95; 428/113,
428/114, 294, 293, 292, 297, 298, 323, 325, 426,
428, 697, 701, 702, 368, 698, 448, 212, 902

[56] References Cited

U.S. PATENT DOCUMENTS

| | | | |
|---|---|---|---|
| 4,428,763 | 1/1984 | Lazden | 428/367 X |
| 4,464,475 | 8/1984 | Beall et al. | 501/9 |
| 4,536,438 | 8/1985 | Bishop et al. | 428/246 |
| 4,554,197 | 11/1985 | Chyung et al. | 428/113 |
| 4,568,594 | 2/1986 | Hordonneau et al. | 428/113 |
| 4,599,256 | 7/1986 | Vasilos | 428/294 X |
| 4,615,987 | 10/1986 | Chyung et al. | 501/8 |
| 4,626,515 | 12/1986 | Chyung et al. | 501/32 |
| 4,738,902 | 4/1988 | Prewo et al. | 428/114 X |
| 4,755,489 | 7/1988 | Chyung et al. | 501/8 |
| 4,810,442 | 3/1989 | Hillig et al. | 264/60 |
| 4,837,230 | 6/1989 | Chen et al. | 428/262 X |
| 4,840,763 | 6/1989 | Freitag | 501/95 X |
| 4,855,262 | 8/1989 | Richon et al. | 501/95 X |

Primary Examiner—Ellis P. Robinson
Assistant Examiner—William P. Watkins, III
Attorney, Agent, or Firm—Kees van der Steere

[57] ABSTRACT

Novel ceramic matrix composition comprising toughened ceramic layers interlaminated with fiber-reinforced ceramic layers and offering improved off-axis and axial properties, are described. The fiber-reinforced layers comprise inorganic reinforcing fibers disposed in a ceramic matrix material, with the reinforcing fibers being oriented along axes parallel with the planes of the layers, while the toughened ceramic layers comprise inorganic whiskers or chopped fibers randomly oriented in the layers.

8 Claims, 2 Drawing Sheets

LAMINATED HYBRID CERAMIC MATRIX COMPOSITES

BACKGROUND OF THE INVENTION

The present invention relates to ceramic matrix composite products known in the art as hybrid composites, comprising combinations of long reinforcing fibers and short reinforcing whiskers, chopped fibers, or particulates. More particularly, the invention relates to hybrid ceramic matrix composites of laminar structure.

It is known to vary the fiber content and/or the arrangement of the fibers in both ceramic and in plastic or polymer based fiber-reinforced composites. In the case of fiber-reinforced plastics, for example, U.S. Pat. No. 4,536,438 to Bishop discloses a composite structure wherein layers of woven fibers are alternated with layers of parallel-oriented fibers in order to improve composite strength. The patent teaches that, in polymer systems of this type, the points of fiber intersection in woven layers were identified as points of weakness, and the inclusion of directed fiber layers was found to provide composites with better residual strength after impact.

Design considerations for ceramic matrix composite materials are significantly different than for fiber-reinforced polymer systems. In ceramic composites, the matrix is a brittle material and the reinforcing fibers generally have higher elastic moduli and higher failure strain than the matrix. The art has recognized that one way to improve the off-axis (i.e., transverse) properties of these composites is to improve the strength and/or toughness of the matrix material.

It is known to incorporate inorganic whiskers or chopped fibers in ceramic matrix materials utilized for the fabrication of ceramic matrix composites in order to increase the microcrack yield point of the matrix. Thus, for example, U.S. Pat. No. 4,615,987 describes glass-ceramic matrix composites comprising a combination of reinforcing fibers and whiskers, while U.S. Pat. No. 4,626,515 discloses a similar hybrid fiber/whisker reinforcement combination for glasses.

Depending upon the ceramic matrix system and combination of fibers employed, these additions have been found to significantly improve the transverse strength of the composite, which is the strength of the material in directions of flexure transverse to the predominant direction of the fiber reinforcement in the material. In addition, improvements in the interlaminar shear strength of these composites, which is the stress at which delamination of adjoining fiber-reinforced layers in the composite have been observed.

There are, however, disadvantages in adding whiskers and/or short fibers to these composite systems to improve matrix performance. For example, the introduction of whiskers into the matrix produces a small but definite reduction in the ultimate strong-axis failure strain exhibited by the resulting hybrid composites. This effect is presently attributed primarily to fiber weakening caused by surface damage to the fibers inflicted by the added whiskers.

Another disadvantage associated with whisker additions to fiber composites appears to be a reduced resistance to high temperature oxidation damage shown by the fibers. The effect in this case is attributed to damage caused by the added whiskers to protective coatings or other protective layers present on the fiber surfaces.

It is a principal object of the present invention to provide novel structures for hybrid ceramic matrix composites wherein high interlaminar shear strength and high transverse strength may be achieved without compromising the ultimate failure strain of the composites.

It is a further object of the invention to provide a method for improving the off-axis properties of fiber-reinforced ceramic matrix composite materials without adversely affecting the strength properties of reinforcing fibers disposed therein.

Other objects and advantages of the invention will become apparent from the following description thereof.

SUMMARY OF THE INVENTION

An important discovery underlying the present invention is that significant improvements in transverse and interlaminar shear strength in conventional fiber-reinforced ceramic matrix composites can be achieved by utilizing the toughening effects of whisker and/or chopped fiber additions in a new way. More particularly, it has now been shown that the introduction of discrete interlaminar zones or layers of whisker- or chopped fiber-toughened ceramic material into conventional fiber-reinforced ceramics can secure substantially all of the benefits of the hybrid structure without incurring the disadvantages of fiber damage and/or reductions in ultimate flexural strength.

Accordingly, the invention first comprises a method for improving the transverse strength and interlaminar shear strength of a fiber-reinforced ceramic matrix composite article comprising layers of fiber reinforced ceramic material. That method comprises introducing into the article, in planes parallel with planes of alignment of reinforcing fibers therein, one or more layers of toughened ceramic matrix material. The toughened ceramic layers are substantially free of long, parallel-aligned fibers, instead comprising a randomly oriented toughening phase comprising inorganic whiskers or short chopped fibers.

This method may be usefully applied to essentially any ceramic matrix composite article, but is particularly useful with laminar composites containing multiple layers of fiber reinforcement wherein the fibers in each layer are aligned in planes parallel with the layers. This includes laminar composites wherein, in each layer, the fibers are all aligned along a common axis forming the strong axis of the layer or composite, as well as wherein the fibers are cross-woven or otherwise distributed along multiple axes of orientation lying within the plane of the layer. In the former case, the direction of fiber alignment in one or more layers may be transverse to the fiber alignment axes in other layers. In either case, however, the laminar composite will generally benefit, either in off-axis properties or in interlaminar shear strength, from the inclusion of toughened ceramic layers interlaminated with and lying parallel with the planes of fiber alignment in the composite.

The invention further includes novel ceramic matrix composites comprising toughened ceramic layers interlaminated with fiber-reinforced ceramic layers and offering improved off-axis and axial properties. More particularly, the invention includes a laminated ceramic matrix composite article comprising a combination of one or more fiber-reinforced ceramic layers and one or more toughened ceramic layers. The fiber reinforced layer(s) comprise inorganic reinforcing fibers disposed in a ceramic matrix material, with the reinforcing fibers being oriented along axes parallel with the planes of the layers. The matrix material in the fiber-reinforce ceramic layers may be substantially free of inorganic whiskers and chopped fibers.

The toughened ceramic layers are interlaminated with, i.e., disposed in layers adjacent to and integrally bonded to, the fiber-reinforced layers, and are characterized in that they comprise inorganic whiskers or chopped fibers randomly oriented in a ceramic matrix material. The ceramic matrix materials in the two layers may be of the same composition and structure, or merely compatible as to physical and chemical properties.

In a preferred embodiment, the composites of the invention comprise multiple thin layers of toughened ceramic material incorporated as interlayers in the composite material, most preferably in alternating arrangement with multiple layers of fiber-reinforced ceramic matrix material. This arrangement most effectively translates the enhanced toughness and high microcrack yield point of the toughened ceramic layers into significant improvements in the axial and off-axis properties of the composite as a whole. For the purposes of the present description, the term "interlayers" includes both interior layers and exterior or facing layers of toughened ceramic material.

Finally, in order to realize the performance benefits of toughened interlayers in composites as hereinabove described, it is found that the elastic modulus of those interlayers should be maintained at values which are approximately equal to or less than the strong-axis elastic modulus of the fiber reinforced layers in the material. A very high elastic modulus in the toughened interlayers, resulting for example from excessive whisker or chopped fiber additions to the material, is found to promote weakening and/or brittle fraction behavior in the final composite structure.

BRIEF DESCRIPTION OF THE DRAWINGS

The invention may be further understood by reference to the drawings wherein.

DETAILED DESCRIPTION

Figure 2:
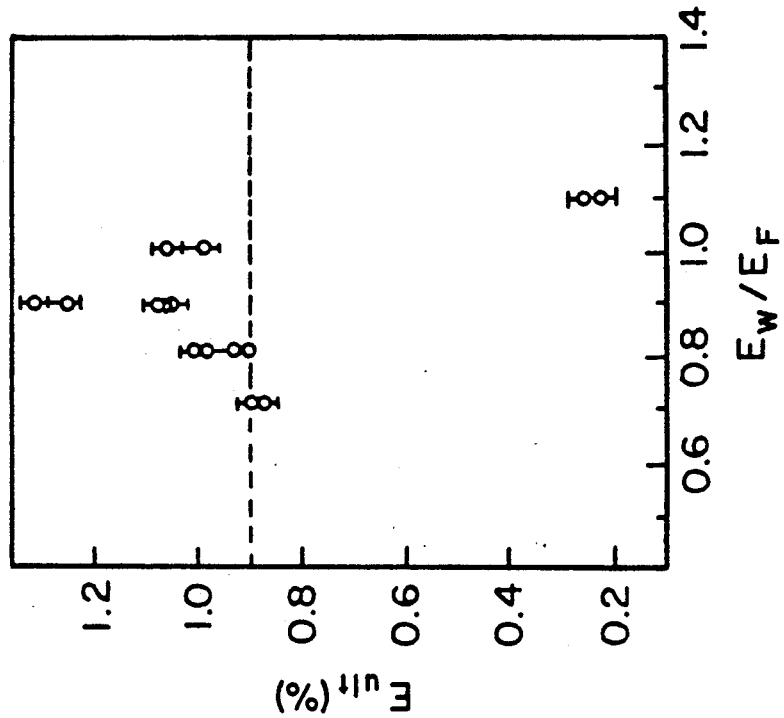
FIG. 2 is a plot of failure strain versus elastic modulus ratio for selected laminated hybrid ceramic matrix composite articles provided in accordance with the invention.

As will readily be appreciated, the invention is not limited in its application to any particular ceramic, glass-ceramic, or glass matrix material for the composite product. Rather, any of a wide variety of these materials may be successfully employed as matrix materials, both for the fiber-reinforced layers and for the whisker-toughened layers of the composites.

For applications requiring best high temperature performance, refractory alkaline earth aluminosilicate glass-ceramics constitute the preferred matrix materials. Such glass-ceramics are disclosed, for example, in U.S. Pat. No. 4,615,987, and include glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

Other refractory alkaline earth aluminosilicate glass-ceramics include those comprising a predominant crystal phase consisting essentially of triclinic anorthite in combination with solution with at least one of mullite and alpha alumina, these glass-ceramics being disclosed in U.S. Pat. No. 4,755,489. Further, U.S. Pat. No. 4,464,475 discloses alkaline earth aluminosilicate glass-ceramics wherein the principal crystal phase is selected from the group consisting of barium osumilite, cordierite, and stuffed cordierite, the ions comprising the stuffing ions in the stuffed cordierite compositions being selected from the group consisting of Ba, Ca, Sr, and $Cs_2O$. Barium-stuffed cordierite glass-ceramics, in particular, exhibit relatively low coefficients of thermal expansion and high elastic moduli.

For somewhat less demanding applications, matrix materials comprising lithium or zinc aluminosilicate glass-ceramics may be selected. U.S. Pat. No. 4,554,197 describes the use of glass-ceramic matrix materials of this type, which may also contain magnesium but which are typically essentially free of $TiO_2$. These glass-ceramics are characterized by the presence of a principal crystal phase selected from the group consisting of beta-quartz solid solution (sometimes referred to as beta-eucryptite solid solution) and beta-spodumene solid solution.

Finally, the invention can be utilized for the strengthening and/or toughening of glass matrix materials as well. The preferred glasses are alkali-free alkaline earth aluminosilicate glasses, such glasses being substantially free of alkali metal oxides such as $Na_2O$, $Li_2O$, and $K_2O$, and including one or more alkaline earth metal oxides selected from the group consisting of CaO, MgO, SrO, and BaO.

While the fibers presently preferred for use in these composites are silicon carbide fibers (also referred to as silicon oxycarbide fibers in the art), the invention is not limited to any particular type of fiber reinforcement. Thus other refractory inorganic fibers useful for ceramic matrix reinforcement, including fibers of carbon, alumina, $B_4C$, BN, zircon, mullite, spinel or silicon nitride, may also be used.

Finally, a wide variety of whisker or chopped fiber materials may be used to provide the toughened ceramic interlayers of these composites. The preferred whiskers are silicon carbide whiskers; however, other whisker materials such as $Si_3N_4$, C, or $Al_2O_3$ may in principal be used. Also any of the fiber compositions above described, particularly including chopped silicon carbide or silicon oxycarbide fibers, can be utilized to make a chopped fiber material suitable for use as a toughening agent in the ceramic matrix materials described. In general, such chopped fiber materials will preferably be characterized by an average chopped fiber length not exceeding about 200 $\mu m$ for best interlayer consolidation properties.

The composites of the invention can be fabricated from materials such as above described utilizing conventional ceramic matrix composite fabrication techniques. The following detailed Example sets forth an illustrative procedure found particularly suitable, although alternative procedures will be readily apparent.

EXAMPLE

A thermally crystallizable alkaline earth aluminosilicate glass is first selected to provide the matrix for the composite product. The glass has a composition of about 35.4% $SiO_2$, 45.0% $Al_2O_3$, 16.5% CaO, 0.5% $As_2O_3$ and 3.0% $ZrO_2$, and upon appropriate heat treatment can be converted to a calcium aluminosilicate glass-ceramic wherein anorthite constitutes the principal crystal phase. It can serve as the matrix for both the fiber-reinforced layers and the toughened matrix layers of the composite.

The glass selected for the matrix is ground by ball milling to provide a fine glass powder of approximately 10 microns average particle size. The ground glass is then ready for incorporation into the composite.

To provide a toughened matrix material, batches comprising the ground glass in combination with a silicon carbide whisker addition are compounded. The whiskers selected for toughening of the matrix are commercially available silicon carbide whiskers, purchased as SC-9 whiskers from the Advanced Composite Materials Corporation, Greer, S.C. The selected glass and whiskers are combined in an isopropanol vehicle to provide suspensions of five different whisker contents, the proportions of whiskers ranging from about 5 to about 25% by weight of the solids, with the remainder consisting of powdered glass. The resulting mixtures are ball-milled for four hours to achieve homogeneous distribution of the whiskers in the suspensions. The solids are then separated from each suspension by filtration and dried.

To form green prepreg sheet from these solids, each solids batch is blended with a polyvinyl butyral binder to provide a slurry, and the slurry is then shaped by doctor blading on a flat substrate to provide a green ceramic tape. Selected tape thicknesses over a thickness range of about 3–20 mils are provided. The green tapes are then dried and removed from the substrate for later processing.

To prepare fiber-reinforced matrix layers for the composite, additional alkaline earth aluminosilicate glass powder produced as above described is incorporated into a flowable slurry in the conventional manner, and fiber tows are drawn through the slurry to obtain thorough impregnation thereof. The fibers selected for use as the reinforcement are silicon oxycarbide fibers, commercially available as Nicalon NLM-202 silicon carbide fiber tows from the Nippon Carbon Company of Tokyo, Japan.

After drawing the fibers through the glass slurry to obtain impregnation thereof, the fibers are collected by winding continuously onto a drum, and the winding is then dried to form a flexible fiber-reinforced prepreg sheet. The sheet thus provided is then removed from the drum, flattened, and then cut into preform sheets having a thickness of about 0.050 inch wherein the fiber content is about 35% by volume of the material.

To provide laminated hybrid composite preforms from the tape and prepreg sheets thus provided, layups comprising alternating layers of the green fiber prepreg sheets and each of the green ceramic whisker-containing tapes is prepared. The bottom layer of each stack is formed by a layer of the whisker-containing tape, and then alternating fiber and whisker layers are added to achieve a multilayer stack wherein the outermost layers are formed of the whisker-containing prepreg material. In this Example, all of the fiber-reinforced layers are placed so that their axes of fiber alignment lie in a single direction, which is the so-called strong axis of the material.

Figure 1:
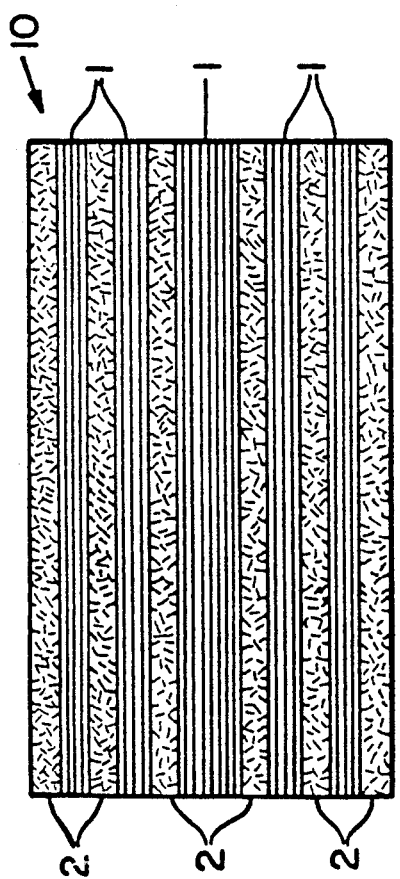
FIG. 1 is a schematic illustration in cross-section of a laminated hybrid ceramic matrix composite article of the invention.

A layered preform produced by this procedure is schematically illustrated in FIG. 1. of the drawing, wherein preform 10 comprises fiber-reinforced layers 1 between and exteriorly of which are disposed multiple whisker-toughened interlayers 2.

To convert the preforms thus provided into composite products, they are first heated to 650° C. in air for approximately two hours to achieve complete volatilization of the binder materials. Thereafter, the stacks are hot pressed in nitrogen to a temperature of 1350° C. at a pressure of 1500 psi. This hot-pressing consolidation is sufficient to convert each stacked preform into a dense laminated hybrid ceramic composite sheet.

The composite products produced as described are next tested for flexural properties utilizing conventional 4-point bend testing procedures. This testing permits measurement of the microcrack stress and strain (elongation) points for the samples, as well as the ultimate flexural stresses and strains, both as determined along the strong or fiber reinforcement axes of the samples.

As customary for these measurements, the microcrack stress and strain points are fixed at the point where microcracking of the sample is first observed, while the ultimate stress and strain values are those determined at the ultimate flexural failure point for the composite. Similar testing of the samples in flexure transverse to the direction of fiber alignment is used to determine the transverse strength of the composite material, while interlaminar shear strengths are determined in the conventional manner by short beam shear testing in three-point flexure.

Representative flexural test data for the laminated hybrid products made and tested as described are set forth in Table I below. Included in Table I for each of the samples recorded are an indication of the whisker loading and tape thickness for the toughened ceramic layers present in the tested composites, as well as the microcrack stress ($\sigma_{mcy}$) and strain ($\epsilon_{mcy}$) and ultimate stress ($\sigma_{ult}$) and strain ($\epsilon_{ult}$) determined on each sample. Also reported for each structure tested are the transverse strength ($\sigma_T$) and interlaminar shear strengths of the samples ($\tau_{ILSS}$).

TABLE I

| | | Properties of Laminated Hybrid Composites | | | | | |
|---|---|---|---|---|---|---|---|
| Whiskers in Tape (%) | Tape Thickness (mil) | $\sigma$MCY (Ksi) | $\epsilon$MCY (%) | $\sigma$ULT (Ksi) | $\epsilon$ULT (%) | $\sigma$T (Ksi) | $\tau$ILSS (Ksi) |
| 25 | 10 mil | 34 | 0.24 | 34 | 0.24 | 18 | 14 |
|  | 15 mil | 27 | 0.20 | 28 | 0.21 | 15 | 12.4 |
| 20 | 10 mil | 32 | 0.24 | 82 | 1.07 | 17 | 17 |
|  | 15 mil | 24 | 0.16 | 79 | 0.99 | 17.8 | 16.5 |
| 15 | 3 mil | 30 | 0.21 | 107 | 1.26 | 12 | 22 |
|  | 6 mil | 32 | 0.22 | 91 | 1.07 | 13.5 | 16.5 |
|  | 10 mil | 45 | 0.27 | 98 | 1.06 | 15 | 17 |

TABLE I-continued

| | | Properties of Laminated Hybrid Composites | | | | | | |
|---|---|---|---|---|---|---|---|---|
| Whiskers in Tape (%) | Tape Thickness (mil) | σMCY (Ksi) | εMCY (%) | σULT (Ksi) | εULT (%) | σT (Ksi) | τILSS (Ksi) |
| | 15 mil | 22 | 0.23 | 94 | 1.05 | 14 | 15 |
| | 21 mil | 24 | 0.23 | 76 | 1.34 | 15 | 15 |
| 10 | 6 mil | 27 | 0.19 | 85 | 0.89 | 14.2 | 14 |
| | 10 mil | 25 | 0.18 | 92 | 0.95 | 15.0 | 15.3 |
| | 15 mil | 22 | 0.17 | 65 | 1.01 | 17 | 14.0 |
| 5 | 10 mil | 21 | 0.15 | 90 | 0.89 | 13.0 | 17.0 |

As will be evident from a study of the data set forth in Table I, the laminated composites of the invention generally exhibit excellent microcrack yield strength and ultimate tensile strength as well as good transverse and interlaminar shear strength. The exceptions, for reasons hereinafter more fully explained, are mainly observed in composites comprising toughened ceramic interlayers with high (25%) whisker loadings, although the latter composites exhibit some of the higher transverse strengths observed.

The effects of varying whisker loading are also manifested in the ultimate failure strains exhibited by these composites. While the composites of the invention are generally characterized by ultimate failure strains in excess of 0.85% and preferably in excess of 0.9%, indicative of a high degree of non-brittle fracture behavior, those composites containing tough ceramic interlayers with whisker loadings above about 20% by weight exhibit low failure strains ($\epsilon_{ult}$) which are more characteristic of brittle materials. The examples in Table I which include toughened interlayers with whisker loadings of 25% exhibit this behavior.

One proposed explanation of this effect is that the fracture behavior of the described laminated composites depends to a large degree on whether the fiber-reinforced layers or the whisker-toughened layers are the principal load-bearing components of the structure. Load bearing depends principally on the relative elastic moduli of the two kinds of layers; the layers with the higher elastic modulus will bear a higher proportion of the load. Increasing the proportion of high-modulus whiskers or chopped fibers in the toughened ceramic interlayers markedly increases the elastic modulus and thus the extent to which those layers are loaded in a stressed material.

It is further postulated that, in the laminated hybrid composites of the invention, properties such as failure strain and the mode of failure, i.e., brittle or tough, are dominated by the failure properties of the major load-bearing components. Hence, in composites wherein the non-brittle fiber-reinforced layers bear most of the load, failure strains will be high and non-brittle breakage will be observed.

Existing sample test data for laminated hybrid composites tend to support the above explanation. For composites such as described in Table I, the elastic modulus of the fiber reinforced layers is calculated at about $18.6 \times 10^6$ psi. The elastic modulus of the whisker-toughened layers depends upon whisker content substantially as reported in Table 2 below.

TABLE 2

| | Elastic Modulus | |
|---|---|---|
| Sample No. | Whisker Content (wt %) | Elastic Modulus (Msi) |
| 1 | 5% | 13.39 |
| 2 | 10% | 15.09 |

TABLE 2-continued

| | Elastic Modulus | |
|---|---|---|
| Sample No. | Whisker Content (wt %) | Elastic Modulus (Msi) |
| 3 | 15% | 16.86 |
| 4 | 20% | 18.75 |
| 5 | 25% | 20.73 |

Even though the data in Table 2 are calculated approximations of elastic modulus values, it appears that, at a whisker loadings approaching 25% by weight, the elastic modulus of the whisker-modified matrix begins to exceed that of the fiber-reinforced material by a significant margin. Thus changes in fracture behavior at about this level of whisker loading would be anticipated.

FIG. 2 of the drawing provides a graphical display of the effect of relative elastic modulus on the ultimate failure strain of laminated hybrid composites provided in accordance with the invention, based on the data reported in Tables 1 and 2 above. The vertical axis of the graph shows the failure strain of the samples, while the horizontal axis plots relative toughened layer elasticity in terms of the ratio of whisker-toughened layer elastic modulus $E_w$ to fiber-reinforced layer elastic modulus $E_f$. The several data points plotted at each value of elastic modulus ratio are for the various thicknesses of toughened whisker layers employed at the various whisker loading levels.

As is evident from a study of FIG. 2, high failure strains (non-brittle behavior) are observed in composites wherein the approximated elastic modulus of the whisker-toughened layers is less than or close to that of the fiber-reinforced layers ($E_w/E_f$ ratios of approximately 1 or less). On the other hand, a significant drop in failure strain is observed for the composite samples comprising 25% by weight of whiskers in the toughened ceramic interlayers, wherein the elastic modulus substantially exceeded the calculated elastic modulus of the fiber-reinforced layers. Significantly, this effect is found to be largely independent of whisker layer thickness in the samples.

Figure 3:
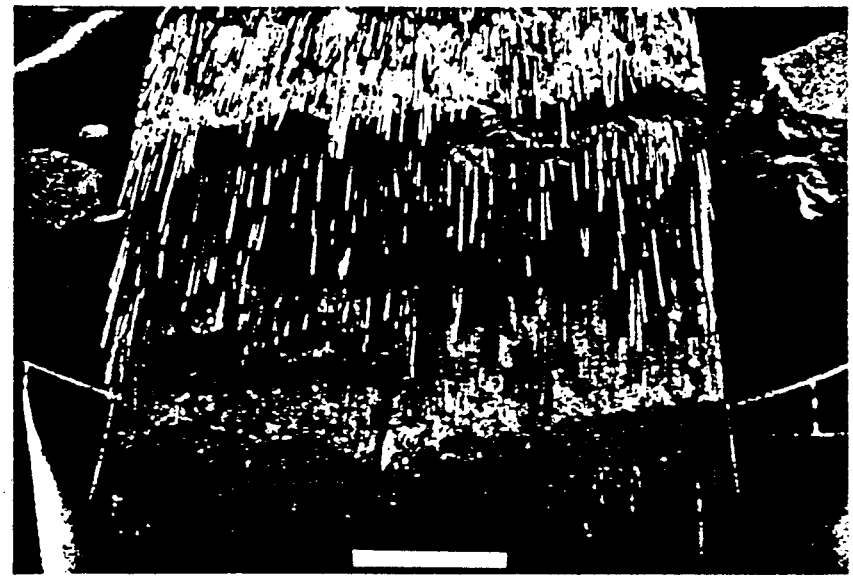
FIGS. 3 and 4 are optical photomicrographs showing the fracture behavior of laminated hybrid ceramic matrix composites such as herein described.
Figure 4:
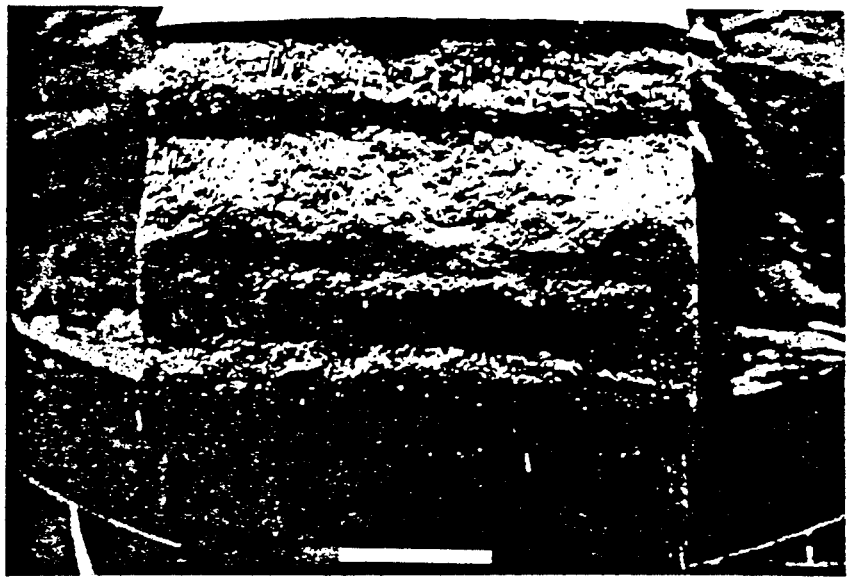

FIGS. 3 and 4 of the drawing compare the appearance of fracture surfaces for two laminated hybrid composite samples made in accordance with the above Example. FIG. 3 shows a fracture surface for a composite wherein whisker-toughened interlayers containing 20% by weight of SiC whiskers were present, the white bar in the figure corresponding to a length of about 1 mm. The fracture surface shows good evidence of fiber pull-out, indicative of non-brittle fracture and a relatively high ultimate failure strain in flexural testing.

In contrast, FIG. 4 of the drawing shows a fracture surface for a composite wherein whisker-toughened interlayers containing 25% by weight of SiC whiskers were present, the white bar in the figure again corresponding to a dimension of 1 mm. The fracture surface shows little evidence of fiber pullout, the fracture mode in this case being primarily brittle and the sample exhibiting very little elongation at the point of ultimate flexural failure.

From these data it appears that, for best off-axis properties, the elastic modulus of the whisker or chopped fiber-toughened layers in composites provided in accordance with the invention should be limited to values which are near to or most preferably less than the elastic modulus of the fiber-reinforced layers of the composites. Stated differently, the ratio of the elastic modulus of the whisker-toughened layers to the elastic modulus of the fiber-reinforced layers should not exceed about 1.1 (i.e., 1.1:1. As is evident from the above description, the proportion of whiskers or chopped fibers introduced into the toughened ceramic layers may readily be controlled to achieve this result.

As previously noted, the toughened ceramic interlayers provided in the composites of the invention may comprise surface layers of whisker-toughened ceramic material as well as interior layers. One advantage of such surface layers, in addition to that of improving the physical properties of the composites, is that they can impart improved erosion resistance to the surfaces of the composites. This is of particular advantage for applications involving exposure of the composites to the eroding effects of high velocity fluid flows at high temperatures.

Figure 5:
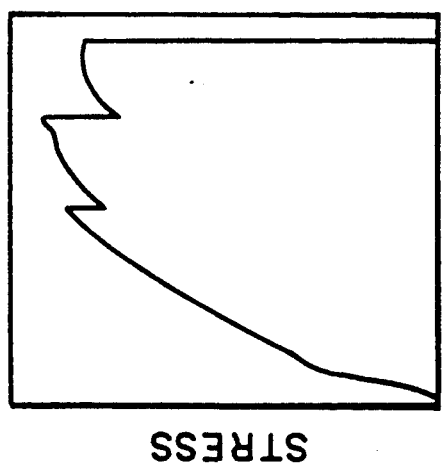
FIG. 5 is a plot of stress versus strain for a laminated hybrid ceramic matrix composite product provided in accordance with the invention.

Still a further advantage of the laminated composite structure is that of controlled fracture characteristics. By virtue of the laminated structure of the material and the fact that fiber-reinforced layers are alternated with whisker-toughened layers in the composite structure, these materials can exhibit a stepped stress-strain behavior under flexural stress. A stress-strain plot of this type is illustrated in FIG. 5 of the drawing for a composite sample in which the direction of fiber orientation in the fiber-reinforced layers is alternated 90° in each successive fiber layer.

This type of flexural behavior is presently attributed to repeated crack interruption occurring at interlayer interfaces as failure of the material proceeds. Potentially, this failure mode offers good prospects for damage detection and a lower incidence of abrupt brittle failure in these composite materials.

A variety of techniques may be utilized for introducing whisker or chopped fiber-toughened ceramic interlayers into fiber reinforced composite structures in accordance with the invention. Although the use of thin green (unconsolidated) whisker-containing ceramic sheets to provide the interlayers is convenient where interlayer thicknesses of the same order as the fiber-reinforced layer thicknesses are desired, only relatively thin whisker toughened interlayers are required for many applications. For these cases, and for thick interlayers as well, alternative methods for providing the interlayers could comprise methods for coating green fiber-reinforced prepreg sheets or tapes with whisker-containing suspensions of ceramic matrix material, e.g,. by spraying or dipping the fiber prepregs in the suspensions. Interlayer thickness in these procedures can be controlled by controlling the viscosity of the whisker suspensions, or by processes for stripping or doctoring excess coating from the coated prepregs.

Of course, the foregoing examples are merely illustrative of products and methods within the scope of the invention which may be resorted to by the skilled art worker within the scope of the appended claims.

I claim:

1. A laminated ceramic matrix composite article comprising:

one or more fiber-reinforced layers comprising long inorganic fibers disposed in a ceramic matrix material, wherein the fibers are oriented along axes parallel with the planes of the layers and wherein the ceramic matrix material is substantially free of inorganic whiskers and chopped fibers; and one or more toughened ceramic matrix layers interlaminated with and integrally bonded to the fiber-reinforced layers, said toughened ceramic matrix layers comprising inorganic whiskers or chopped fibers randomly oriented in a ceramic matrix material, wherein said ceramic matrix material is substantially free of long oriented inorganic fibers, and wherein said whiskers and said chopped fibers comprise less than 25% by weight of said toughened ceramic matrix layers; and wherein the ratio of the elastic modulus of said toughened ceramic matrix layers to the elastic modulus of said fiber-reinforced layers does not exceed about 1.1.

2. A laminated ceramic matrix composite article in accordance with claim 1 wherein the toughened ceramic matrix layers are provided as interior interlayers.

3. A laminated ceramic matrix composite article in accordance with claim 1 wherein the toughened ceramic matrix layers are provided as a combination of interior and surfacing interlayers.

4. A laminated ceramic matrix composite article in accordance with claim 1 wherein the ceramic matrix material provided in the fiber-reinforced layers and toughened ceramic matrix layers is of the same composition and structure.

5. A laminated ceramic matrix composite in accordance with claim 1 wherein the inorganic fibers provided in the fiber-reinforced layers are silicon carbide or silicon oxycarbide fibers.

6. A laminated ceramic matrix composite in accordance with claim 1 wherein the inorganic whiskers or chopped fibers provided in the toughened ceramic matrix layers are silicon carbide or silicon oxycarbide whiskers or chopped fibers.

7. A laminated ceramic matrix composite article in accordance with claim 5 wherein the ceramic matrix material provided in the fiber-reinforced layers and toughened ceramic matrix layers is an alkaline earth aluminosilicate glass-ceramic matrix material.

8. A laminated ceramic matrix composite article in accordance with claim 7 wherein the alkaline earth aluminosilicate glass-ceramic material is a calcium aluminosilicate glass-ceramic comprising anorthite as the principal crystalline phase.

* * * * *